United States Patent [19]
Goldstein et al.

[11] 4,013,511
[45] Mar. 22, 1977

[54] IMMOBILIZED ENZYMES

[75] Inventors: Leon Goldstein; Ephraim Katzir (Katchalski), both of Rehovot; Yehuda Levin, Tel-Aviv; Shmaryahu Blumberg, Rishon Lezion, all of Israel

[73] Assignee: Yeda Research & Development Co. Ltd., Rehovot, Israel

[22] Filed: May 10, 1974

[21] Appl. No.: 469,043

[30] Foreign Application Priority Data

May 13, 1973 Israel .................................. 42254

[52] U.S. Cl. .................................. 195/63; 195/68; 195/DIG. 11; 426/36; 426/42; 526/15; 526/50; 526/51; 526/271
[51] Int. Cl.² .................................. C07G 7/02
[58] Field of Search ............... 195/63, 68, DIG. 11; 260/112 R, 78.5 R, 80.3 N; 426/12, 36, 42; 210/41; 252/426

[56] References Cited
UNITED STATES PATENTS

| | | | |
|---|---|---|---|
| 3,597,220 | 8/1971 | Weinrich et al. | 426/12 |
| 3,650,900 | 3/1972 | Cerin et al. | 195/63 |
| 3,706,633 | 12/1972 | Katchalski et al. | 195/68 X |

OTHER PUBLICATIONS

Hornby et al., The Preparation Of Trypsin Chemically Attached to Nylon Tubes, Biochim. Biophys. Acta. vol. 220, 1970, (pp. 343-345).
Levin et al., A Water-Insoluble Polyanionic Derivative of Trypsin, Biochemistry, vol. 3, No. 12, 1964, (pp. 1905-1912).
Ferrier et al., Continuous Coagulation of Skimmilk With Insoluble Pepsin, J. Dairy Science, vol. 54, No. 5, 1971, (p. 762).

*Primary Examiner*—David M. Naff
*Attorney, Agent, or Firm*—Browdy and Neimark

[57] ABSTRACT

Enzymes are convalently found to anionic or cationic hydrophilic polymeric carriers formed by essentially complete reaction of pendent anhydride groups of ethylene-maleic anhydride copolymer (EMA) with a diamine selected from the group consisting of hydrazine, P, P'-diaminodiphenylmethane and 1,6-diaminohexane to produce resins having pendent amine groups. The EMA-hydrazide and EMA- P,P'-diaminodiphenylmethane resins can be rendered cationic by reaction with N,N-dimethyl-1,3-propanediamine.

1 Claim, No Drawings

IMMOBILIZED ENZYMES

SUMMARY OF THE INVENTION

The present invention relates to novel polymeric carriers suitable for bonding of biologically active proteins, and especially for the bonding of enzymes. More particularly, the present invention relates to polymeric carriers which are the reaction product of ethylene-maleic anhydride copolymer (EMA) and a suitable diamine, such as hydrazine (EMA hydrazide resin), p,p'-diaminodiphenyl methane (EMA-MDA resin) or a primary aliphatic diamine such as 2,6-diaminohexane (EMA-HMD resin). EMA-hydrazide and EMA-MDA resins are anionic. The invention relates also to cationic resins prepared from these by reacting same with N,N-dimethyl-1,3-propane-diamine (DMPA) in the presence of an activating agent. The invention relates also to the reaction products of the said resins with biologically active proteins, and especially to carrier bound enzymes prepared by coupling such resins with suitable enzymes. The invention further relates to enzymatic processes effected by means of the novel carrier-bound enzymes, and especially to processes such as clotting milk by contacting a suitable EMA-HMD-pepsin preparation with milk. Other and further objects of the present invention will become apparent hereinafter.

BACKGROUND OF THE INVENTION

Immobilized enzyme derivatives serve as specific, easily removable catalysts, that can be used repeatedly in columns and in batch reactors. A large number of immobilized enzyme systems have been described in the literature (see for example Goldstein L. and Katchalski E, Z. Anal. Chem. 243 (1968) 375).

Most of the natural hydrophilic polymers used for the covalent binding of enzymes are polysaccharides (e.g. derivatized celluloses or cross-linked dextrans) and their chemical reactivity and mechanical stability and are limited by the properties of the monomer unit. Synthetic polymeric carriers offer a much wider range of properties, which can be adapted to specific needs by appropriate modification of the chemical composition of the material. In many cases, however, derivatives of enzymes bound to synthetic polymers exhibit low temperature and lyophilization stabilities, presumably due to the hydrophobic nature of the support.

DESCRIPTION OF THE PREFERRED EMBODIMENTS

The present invention relates to novel hydrophilic, anionic or cationic, polymeric reagents which contain diazonium acylazide or primary amine functional groups. The starting material is a commercially available 1:1 copolymer of ethylene and maleic anhydride (EMA). By coupling EMA with p,p'-diaminodiphenylmethane (methylenedianiline, MDA), with hydrazine or with 2,6-diaminohexane (HMD) high capacity anionic arylamine, acylhydrazide or primary aliphatic-amine resins are obtained (the resins are designated EMA-MDA, EMA-hydrazide and EMA-HMD respectively; Scheme 1; (A & B)). The anionic EMA-MDA and EMA-hydrazide resins serve as parent compounds for conversion to the appropriate cationic amidopropyldimethylamino preparations. This is carried out by coupling the free carboxyls on the resin with N,N-dimethyl-1,3-propanediamine (DMPA) in the presence of dicyclohexylcarbodiimide, DCC (Scheme 2). The anionic and cationic EMA-MDA and EMA-hydrazide and the EMA-HMD resins were coupled to several enzymes, following appropriate activation. The EMA samples were dried in vacuo over $P_2O_5$, at 110° for 48 hours before use. All reagents and buffers were of the best grade available.

The following abbreviations are used: EMA: ethylene-maleic anhydride (1:1) copolymer; MDA: p,p'-diaminodiphenylmethane (methylenedianiline); HMD: 1,6 diaminohexane (hexamethylenediamine); DCC: N,N'-dicyclohexylcarbodiimide, EDC: 1-ethyl-3(3-dimethylaminopropyl) carbodiimide, HCl. EMA-MDA, EMA-hydrazide and EMA-HMD are used to designate the resins obtained by the coupling of EMA with p,p'-diaminodiphenylmethane, hydrazine or 1,6-diaminohexane respectively, (see Scheme 1). Degrees are degrees centigrade.

The following examples illustrate the present invention, which is not restricted to these.

EXAMPLE I

Preparation of EMA-hydrazide Resins

Preparation of Anionic EMA-hydrazide Resins. The EMA-hydrazide resins were prepared in two steps. EMA was first crosslinked by the addition of 30 mole percent hydrazine. The crosslinked insoluble EMA was then reacted with a two-fold excess of hydrazine to achieve complete conversion of the anydride residues into acylhydrazide groups. The procedure was as follows: Oven-dried EMA (12.6 gms; 0.1 base moles anhydride) was dissolved with stirring in redistilled dimethyldulfoxide, DMSO (100 ml). A solution of hydrazine hydrate in DMSO (1.5 gms in 50 ml; 0.03 moles) was then added slowly with strong stirring. The reaction mixture solidified immediately into a glassy gel. The solid was broken with a glass rod and left at room temperature for 24 hours in a closed vessel, to allow the completion of the crosslinking reaction. The solid glassy material was covered with excess dry acetone, stirred for a few minutes and allowed to settle. The liquid was decanted and the procedure repeated. The solid material was again suspended in acetone, ground in an homogenizer and allowed to settle. The grinding was repeated several times with fresh portions of acetone until the solid material acquired hard resinous texture as judged by its ease of filtration on a suction filter. After air drying for a few minutes on the filter to remove the acetone, the resin was suspended in 100 ml DMSO, reacted again wwith hydrazine (10 gms hydrazine hydrate in 100 ml DMSO; 0.2 moles) and left stirring overnight at room temperature.

The reaction mixture was poured into acetone, the liquid decanted and the solid ground several times with acetone, washed with acetone on a suction filter and air dried. Traces of solvent were removed by leaving the material over $P_2O_5$ in a dessicator connected to a high vacuum pump for a few hours. The net weight of dry EMA-hydrazide resin was 10–12 gms.

Cationization of EMA-hydrazide Resins. Anionic EMA-hydrazide resin (2 gms; $1.3 \times 10^{-2}$ base moles carboxyl) was suspended in a dimethylsulfoxide solution of dicyclohexylcarbodiimide (6 gms in 60 ml; $3.0 \times 10^{-2}$ moles). N,N-dimethyl-1,3-propanediamine, DMPA (10 ml; 0.1 moles) was slowly added to the magnetically stirred suspension. The reaction mixture was left stirring overnight at room temperature. The resin was separated by centrifugation, resuspended in dimethylsulfoxide, stirred magnetically for a few minutes and centrifuged down again. The procedure was repeated twice to ensure the removal of reagents. The cationized resin was then suspended in acetone, stirred magnetically for a few minutes, and separated on a suction filter. After several washings with acetone the resin was air-dried and left overnight over $P_2O_5$ in a thoroughly evacuated dessicator, to remove traces of solvent. Other suitable amino-alkyl-N-dialkylamino derivatives can be used as well.

Activation of EMA-hydrazide Resins. EMA-hydrazide resin (100 mg) was suspended in 50% acetic acid, 0.1 N in HCl (8 ml) and stirred for 30 minutes at room temperature. The stirred suspension was cooled to 4°, aqueous sodium nitrite (40 mg in 1 ml water) was added dropwise and the mixture stirred for 1 hr over ice. The activated resin was separated on a suction filter and exhaustively washed on the filter with cold water. It was then resuspended in water and brought to pH 9 by the dropwise addition of 0.5 N NaOH, crushed ice being added to keep the temperature down. The polymeric acyl-azide was separated by filtration, washed with 0.2 M borate buffer pH 8.4, resuspended and used directly in the coupling experiments.

Coupling of Anionic EMA-hydrazide Resins to Proteins A cold freshly prepared solution of an enzyme in 0.2 M borate buffer pH 8.4 (10-40 mg in 2 ml) was slowly added to the magnetically stirred suspension of EMA-hydrazide (100 mg in 5 ml of the same buffer); The reaction mixture was left stirring overnight at 4°. The water-insoluble EMA-hydrazide enzyme derivative was separated by centrifugation and washed with water, 1M KCl, again with water and then suspended in water.

Coupling of Cationic EMA-hydrazide Resins to Proteins, was performed in 0.2 M borate, pH 8. The subsequent washings of the insoluble enzyme derivative were carried out as described for the anionic EMA-hydrazide resin.

EXAMPLE 2

Preparation of EMA-MDA Resins

Preparation of Anionic EMA-MDA Resins. Oven-dried EMA (12.6 gms; 0.1 base moles anhydride) was dissolved with stirring in redistilled dimethylsulfoxide (100 ml.). A dimethylsulfoxide solution of p,p'-diaminodiphenylmethane (39.6 gms in 200 ml; 0.2 moles) was added to the vigorously stirred EMA solution. The reaction mixture solidified after 2-3 minutes. The solid was broken with a glass rod and left standing at room temperature for 24-48 hours in a closed vessel. The hard, glassy gel was covered with acetone, stirred for a few minutes, the solid was allowed to settle and the liquid decanted. This procedure was repeated twice. The hardened, opaque material was then ground with acetone, the liquid was filtered off on a suction filter and the grinding repeated several times until a fine, hard powder of resin-like texture was obtained. The powder was washed with acetone on the filter and air-dried. Traces of organic solvent were removed by leaving the material for a few hours over $P_2O_5$ in a dessicator connected to a high vacuum pump. The net weight of dry EMA-MDA resin was about 28 gms.

Cationization of EMA-MDA Resins, was carried out as described for the EMA-hydrazide resins.

Diazotization of EMA-MDA resins. EMA-MDA resin (100 mg) was suspended in 50% acetic acid 0.1 N in HCl (8 ml) and stirred for about 30 minutes at room temperature. The stirred suspension was chilled to 4° and aqueous sodium nitrite (40 mg in 1 ml) was added dropwise. The diazotization mixture was stirred for 1 hour over ice, filtered with suction and washed with cold water to remove the acid. The resin was resuspended in water and brought to alkaline pH (~10) by the dropwise addition of 0.5 N NaOH, crushed ice being added to keep the temperature down. The dark red-brown polydiazonium resin was separated by filtration, washed with cold 0.2 M phosphate buffer pH 7.8, resuspended and used directly in the coupling experiments.

Coupling of Anionic EMA-MDA Resins to Proteins. A cold solution of an enzyme in 0.2 M phosphate buffer pH 7.8 (10-40 mg in 2 ml) was slowly added to the magnetically stirred suspension of diazotized EMA-MDA (100 mg) in the same buffer (4 ml). The reaction mixture was left stirring overnight at 4°. The water-insoluble EMA-MDA enzyme derivative was separated by centrifugation or filtration, washed with water, 1 M KCl and again with water and resuspended in water.

Coupling of Cationic EMA-MDA Resins to Proteins was carried out as described for the polylanionic EMA-MDA resins.

EXAMPLE 3

Preparation of EMA-HMD Resin

Oven-dried EMA (1.26 gms; 0.01 base moles anhydride) was dissolved in 20 ml redistilled dimethylsulfoxide. A solution of 3.5 gms (0.03 moles) HMD in 20 ml DMSO was added slowly to the vigorously stirred EMA solution. The reaction mixture solidified almost immediately. The hard gel was broken with a glass rod and left overnight at room temperature in a covered vessel. The glassy material was dispersed in a dicyclohexyl carbodiimide solution, 3 gms (0.0145 moles), in 20 ml DMSO, and stirred magnetically for 3-4 hours. The swollen resin was centrifuged, resuspended in DMSO, and centrifuged again. The precipitate was washed twice with hot ethanol to remove traces of reagents and dicyclohexylurea; it was then suspended in water, ground in a blender and lyophilized. Net weight of lyophilized powder, 3.1 gms.

Coupling of Pepsin to EMA-HMD Resins. EMA-HMD resin (100 mg) was suspended in 2 ml 1N HCl and stirred at room temperature for about 10 minutes. The swollen resin was separated on a suction filter washed on the filter with 100 ml water, brought to pH 4, resuspended in 2 ml distilled water, and the suspension brought to pH 4.0. A freshly prepared solution of 10 mg pepsin dissolved in 1 ml distilled water was added to the magnetically stirred suspension and the pH readjusted to 4.0. 20 mg EDC in 1 ml water was added and the pH maintained at 4.0 with 0.1 N HCl. After 30-60 minutes, when no measurable changes in pH could be observed, the reaction mixture was transfered to the cold room and left stirring overnight. The immobilized enzyme was separated by centrifugation, washed with 1M KCl, acidified to pH 4.0 (100 ml) and then with 0.01N HCl; it was then suspended in 5 ml 0.01N HCl and stored at 4° C.

Coupling of Trypsin to EMA-HMD Resins. EMA-HMD resin (100 mg) was suspended in 0.1N NaOH, stirred for about 5 minutes, washed with water and resuspended in 4 ml of a 12 percent glutaraldehyde solution of pH 9.0 (this solution was prepared by diluting commercial 25% aqueous glutaraldehyde with an equal volume of 0.2 molar borate pH 9.0 and readjusting the pH.).

The reaction mixture was stirred for 1 hour at room temperature washed exhaustively with water and finally with 0.1 M phosphate buffer, pH 8.0. The resin was resuspended in cold 0.1 M phosphate, pH 8.0, (2 ml). Trypsin (10 mg dissolved in 1 ml of the same buffer) was then added to the magnetically stirred suspension and the reaction allowed to proceed overnight in the cold room. The immobilized enzyme was separated by centrifugation or filtration, washed with 1.0 M KCl (100 ml) and then with water and resuspended in water.

The particle size of the resins was estimated by examination of aqueous suspensions of the powders under the microscope. The mean diameter of the dry resin particles was in the range of 20–40 microns. Following preswelling in 50% acetic acid or the binding of protein, the mean diameter was found to increase by a factor of 3 to 4.

The composition and properties of the resins prepared according to the procedures of Examples 1–3 are summarized in Table I.

DETERMINATION OF ENZYME ACTIVITIES

The activities of the various enzymes and water-insoluble derivatives, with the exception of pepsin and EMA-HMD pepsin, were determined at 25° by the pH-stat method using the appropriate ester substrates. A Radiometer pH-stat consisting of the SBR 2c/SBU-1/TTA3 titration assembly and the PHM 26C pH meter was used. The titrant was 0.1 N NaOH. The activities calculated from the initial rates of the substrate hydrolysis were expressed in esterase units. One unit of esterase activity was defined as that amount of enzyme which catalyzed the hydrolysis of 1 $\mu$mole of substrate per minute under the specified assay conditions. Trypsin and papain were assayed using benzoyl-L-arginine ethyl ester as substrate. The assay mixture (5 ml) was 1.16 × $10^{-2}$ M benzoyl-L-arginine ethyl ester, 0.01 M KCl for trypsin and 0.05 M benzoyl-L-arginine ethyl ester, 0.005 M cystein, 0.002 M EDTA for papain. Chymotrypsin, subtilisin Novo and subtilisin Carlsberg were assayed using acetyl-L-tyrosine ethyl ester 1.18 × $10^{-2}$ M 0.01 M KCl 5 ml as substrate. The optimal pH's of activity for trypsin, chymotrypsin, subtilisin Novo, subtilisin Carlsberg and papain and their immobilized derivatives are given in Table V.

The enzymic activity of crystalline pepsin and the immobilized pepsin derivatives was determined at 37° C by the hemoglobin method, essentially as described by Herriott, Methods Enzymol. 2, (1955) 3. The reaction mixture containing immobilized enzyme were stirred magnetically to ensure effective mixing of the reagents. One unit of enzymic activity was defined as that amount of pepsin or immobilized pepsin derivative which led to a change in absorbance at 280 nm of the TCA soluble fraction of 0.001 per minute, under the conditions of the assay.

Milk-clotting experiments were carried out routinely at 30° C by the addition of about 20 $\mu$gm cryst. pepsin (~ 80 units) or the equivalent amount of immobilized pepsin to 10 ml of reconstituted skim milk (12 g skim milk powder dissolved in 100 ml 0.01M $CaCl_2$, pH 5.6 (Berridge N. J. Methods Enzymol. 2 (1955) 69).

The protease activities of the various enzymes and of their immobilized derivatives were determined at pH 7.5, 37° C, by the casein digestion method (Laskowski M. Methods Enzymol. 2 (1955) 26). The amounts of enzyme or insoluble enzyme derivative added to the digestion mixture were expressed in units of esterase activity. The reaction mixtures containing immobilized enzyme were stirred magnetically to ensure effective mixing of the reagents.

BINDING OF PROTEINS

Representative data on the maximal protein binding capacities of the various resins are summarized in Table II. The capacity of EMA-hydrazide resins is considerably higher than that of EMA-MDA or EMA-HMD resins. This could be due to the higher hydrophilicity of the EMA-hydrazide network, leading to a more open structure, and thus to a higher capacity for proteins.

The EMA-MDA enzyme derivatives had particulate form and were easily filtered. The immobilized enzyme samples derived from EMA-hydrazide and EMA-HMD were more swollen, of softer texture, and filtered slowly.

The recovery of enzymic activity in insoluble derivatives prepared under standard conditions (10 mg enzyme per 100 mg resins, in the coupling mixture) was higher when the support was EMA-hydrazide (Table III). The total activity recovered in immobilized form was found to depend on the charge characteristics of the support; the anionic resins yielded in general higher total immobilized activity (Table III). Comparison of the data of Tables II and III with values in the literature shows that the recovery of immobilized enzymic activity with the various resins was, in most cases, higher or comparable with the values recorded for other support materials. (Goldman R., Goldstein L. and Katchalski E. in "Biochemical Aspects of Reactions on Solid Supports" G. R. Stork ed. pp. 1–78, Academic Press. N.Y., 1971.).

PROPERTIES OF THE IMMOBILIZED EMA-MDA, EMA-HYDRAZIDE AND EMA-HMD ENZYME DERIVATIVES

Stability

Aqueous suspensions of anionic EMA-MDA derivatives of chymotrypsin, subtilisin Carlsberg and subtilisin Novo could be stored at 4° for 3–4 months without significant loss of activity. Suspensions of EMA-MDA papain and EMA-MDA trypsin could be stored under the same conditions for periods of up to 8 months with no decrease of activity. The corresponding cationic EMA-MDA derivatives lost 20–30% of their activity under the same conditions.

The EMA-hydrazide derivatives (both anionic and cationic) of trypsin, chymotrypsin, subtilisin Novo, subtilisin Carlsberg and papain exhibited extremely high storage stabilities. No loss of activity was recorded after storing suspensions at 4°, for about 1 year, in the presence of a bactericide.

The EMA-HMD derivatives of trypsin and pepsin could be stored at 4° C for 4 months without significant loss of activity.

On lyophilization the anionic EMA-MDA derivatives retained a considerable amount of activity. The EMA-hydrazide derivatives retained most of their activity on lyophilization. On lyophilization EMA-HMD pepsin retained 70–80% of its activity. EMA-HMD trypsin retained 25% of its activity, (Table IV). Storage of the lyophilized powders in a dessicator at 25° C for about 1 year was accompanied by no loss of activity.

Relative to the corresponding native enzymes all anionic EMA-hydrazide, anionic EMA-MDA derivatives and the EMA-HMD derivatives exhibited higher stabilities in the alkaline pH-range. Enhanced stabilities in the acid pH-range were found for the cationic EMA-hydrazide and EMA-MDA derivatives.

The temperature stabilities of the EMA-hydrazide, EMA-MDA and EMA-HMD derivatives were higher than those of the respective native enzymes. With the enzyme derivatives of the cationic EMA-MDA and EMA-hydrazide resins decrease in temperature stability relative to the anionic analogies was found in all cases.

Kinetic Properties

The pH-activity profiles of the water-insoluble enzyme derivatives were broader and the pH-optima displaced towards more alkaline pH-values relative to the corresponding native enzymes. The values of the kinetic parameters of all water-insoluble enzyme derivatives investigated are summarized in Table V.

The caseinolytic activities of the immobilized enzyme derivatives calculated on the basis of the amount of active bound enzymes were lower than those of the corresponding native enzymes.

slower by a factor of about 2.5 as compared to native enzyme.

The two stages of the clotting process — the enzymatic stage and the secondary coagulation stage, (Foltman B. Corrpt. rend. trav. Lab. Carlsberg 35 (1966) 143) could be separated when clotting was effected by immobilized pepsin. The primary enzymatic stage was carried out at 4° in the absence of $Ca^{++}$ ions. The immobilized enzyme was then removed by filtration and the coagulation stage carried out at 30° following the addition of $CaCl_2$ (to 0.01M), in the absence of enzyme.

Repeated used of the immobilized enzyme led to gradual loss of its ability to clot milk. This may be due to the absorption of casein or to the slow formation of a milk clot around the enzyme particles.

The synthetic method described is not limited to the cases discussed. By proper choice of bifunctional reagent (e.g. aliphatic diamines, aminoalcohols etc.) EMA-derived resins of a wide range of chemical and charge characteristics can be prepared.

Such resins are potential supports both for insolubilization of enzymes, where a given property required for the immobilized enzyme can be built-in in the carrier polymer, and in affinity chromatography where a property of the carrier, e.g. charge, can be superimposed on the specificity of an immobilized ligand to fit specific needs.

TABLE 1

COMPOSITION AND PROPERTIES OF ANIONIC EMA-MDA AND EMA-HYDRAZIDE AND OF EMA-HMD RESINS

| Resin | Nitrogen Content* (%) | MDA hydrazine or HMD content** (moles/gm) | EMA to MDA, hydrazine or HMD ratio | Coupling Capacity*** (Equiv/gm) |
|---|---|---|---|---|
| EMA-MDA | 6.54 | $2.34 \times 10^{-3}$ | 1.83 | $0.80 \times 10^{-3}$ |
| EMA-hydrazide | 10.5 | $3.75 \times 10^{-3}$ | 1.86 | $0.122 \times 10^{-3}$ |
| EMA-HMD | 11.17 | $3.99 \times 10^{-3}$ | 1.07 | $0.92 \times 10^{-3}$ |

*Determined by the Dumas combustion method (Steyermark A., Quantitative Organic Microanalysis, 2nd ed. pp. 177–178, Academic Press, New York, 1961).
**Calculated from the nitrogen content of the resins.
***Estimated, in the case of EMA-MDA, from the nitrogen and bromine content of the conjugate of the diazotized resin with p-bromophenol (Goldstein L., Pecht M., Blumberg S., Atlas D., and Levin Y. Biochemistry 9 (1970) 2322); in the case of EMA-hydrazide, from the glycine content of the conjugate of the activated resin with glycine and in the case of EMA-HMD from the primary amino-nitrogen, determined by the Van Slyke method (Archibald R.M., Methods Enzymol. 3 (1957) 458).

Milk Clotting

Experiments with reconstituted skim milk (0.01M in each) showed that clotting by EMA-HMD pepsin was

TABLE II

PROTEIN BINDING CAPACITIES OF ANIONIC EMA-MDA AND EMA-HYDRAZIDE RESINS FOR VARIOUS ENZYMES

| | EMA-MDA Resins (A) or EMA-HMD Resins (B) | | | | EMA-hydrazide Resins | | | |
|---|---|---|---|---|---|---|---|---|
| | Protein Content | | Active Bound Protein** | | Protein Content | | Active Bound Protein** | |
| Enzymes | Calculated from binding curves* (mg/100 mg) | Calculated from amino acid analyses* (mg/100 mg) | mg | % | Calculated from binding curves* (mg/100 mg) | Calculated from amino acid analyses* mg/100 mg) | mg | % |
| Trypsin | 10(A) | 9.7(A) | 3.4(A) | 34)A) | 30 | 29 | 12.0 | 40 |
| | 10(B) | 9.8(B) | 4.0(B) | 40(B) | | | | |
| Chymotrypsin | 10(A) | 0.8(A) | 2.0(A) | 20(A) | 25 | 24.1 | 3.2 | 13 |
| Subtilisin Novo | 20(A) | 18(A) | 5.4(A) | 27(A) | 10 | 9.7 | 1.0 | 10 |
| Subtilisin Carlsberg | 20(A) | 24(A) | 2.0(A) | 10(A) | 10 | 9.8 | 1.0 | 10 |
| Papain | 30(A) | 31(A) | 9.4(A) | 31.4(A) | 45 | 44.2 | 27 | 60 |
| Pepsin | 10(B) | 9.7(B) | 3.0(B) | 30(B) | — | — | — | — |

Method essentially as described by Goldstein et al, Biochemistry 9 (1970) 2322.
Estimated from the esterase activity of the immobilized enzyme preparation.

TABLE III

| | RECOVERY OF IMMOBILIZED ENZYMIC ACTIVITY* | | | | |
|---|---|---|---|---|---|
| | EMA-MOA Resin | | EMA-hydrazide Resin | | EMA-HMD |
| Enzyme | Anionic | Cationic | Anionic | Cationic | Resin |
| Trypsin | 30% | 9.5% | 80% | 75% | 40% |
| Chymotrypsin | 28% | 10% | 50% | 30% | — |
| Subtilisin Novo | 27% | 16% | 18% | 12% | — |
| Subtilisin Carlsberg | 14% | 3.5% | 34% | 19% | — |
| Papain | 34% | 30% | 50% | 55% | — |
| Pepsin | — | — | — | — | 31% |

*Immobilized derivatives prepared under standard conditions - 10 mg enzyme per 100 mg resin in the coupling mixture.

The specific activities of the native enzymes employed were as follows:

| | Units/mg |
|---|---|
| Trypsin | 35 |
| Chymotrypsin | 350 |
| Subtilisin Novo | 280 |
| Subtilisin Carlsberg | 800 |
| Papain | 16 |
| Pepsin | 3150 |

TABLE IV

| | RETENTION OF ACTIVITY FOLLOWING LYOPHYLIZATION | | | | |
|---|---|---|---|---|---|
| | EMA-MDA Resin | | EMA-hydrazide Resin | | EMA-HMD |
| | Anionic | Cationic | Anionic | Cationic | Resin |
| Trypsin | 76% | 46% | 100% | 93% | 25% |
| Chymotrypsin | 30% | 8% | 50% | 91% | — |
| Subtilisin Novo | 60% | 5% | 70% | 98% | — |
| Subtilisin Carlsberg | 27% | 22% | 70% | 86% | — |
| Papain | 42% | — | 90% | — | — |
| Pepsin | — | — | — | — | 80% |

TABLE V

| KINETIC PARAMETERS OF THE EMA-MDA, EMA-HYDRAZIDE AND EMA-HMD ENZYME DERIVATIVES | | | | | | | | | | | | |
|---|---|---|---|---|---|---|---|---|---|---|---|---|
| | TRYPSIN | | CHYMOTRYPSIN | | SUBTILISIN NOVO | | SUBTILISIN CARLSBERG | | PAPAIN | | PEPSIN | |
| | Optimal pH | $K_m$ (app) mM | Optimal pH | $K_m$(app) mM | Optimal pH | $K_m$(app) mM | Optimal pH | $K_m$(app) mM | Optimal pH | $K_m$(APP) | Optimal pH | $K_m$(app) mM |
| Native Enzyme | 8.0 | $10^{-5}$ | 8.3 | 0.7±0.1 | 8.2 | 54.5±10 | 8.6 | 26±8 | 6.3 | 10.2±1.0 | 2.5 | — |
| EMA-MDA | | | | | | | | | | | | |
| Anionic | 9.0 | 0.36±0.1 | 9.5 | 7.9±0.8 | 9.2 | 66±12 | 9.4 | 34±12 | 7.5 | 41±5 | — | — |
| Cationic | 9.0 | 0.22±0.15 | 9.2 | 1.45±0.8 | 9.0 | 126±25 | 9.2 | 130±30 | 7.5 | 60±8 | — | — |
| EMA-HYDRAZIDE | | | | | | | | | | | | |
| Anionic | 9.2 | 0.28±0.1 | 9.7 | 4.7±0.9 | 9.5 | 100 | 9.25 | 76±18 | 7.5 | 30±4 | — | — |
| Cationic | 9.2 | 2.8±0.8 | 9.7 | 15±3 | 9.5 | 100 | 9.2 | 84±21 | — | — | — | — |
| EMA-HMD | 9.5 | $10^{-4}$ | — | — | — | — | — | — | — | — | 2.5 | — |

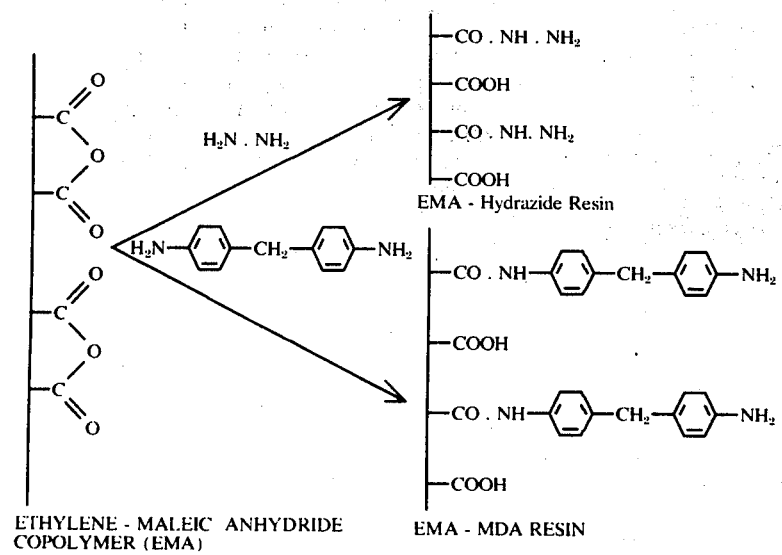

A. Synthesis of EMA-MDA and EMA-hydrazide resins.

-continued

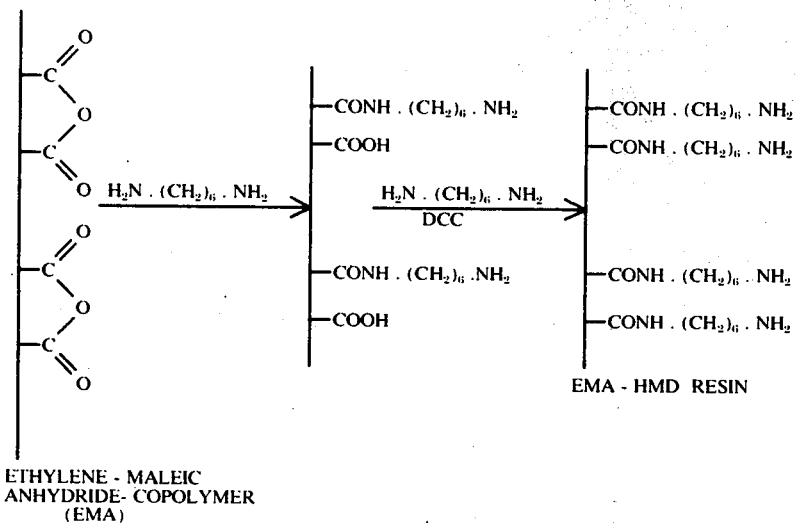

ETHYLENE - MALEIC
ANHYDRIDE- COPOLYMER
(EMA)

B. Synthesis of EMA-RESIN.

SCHEME 1

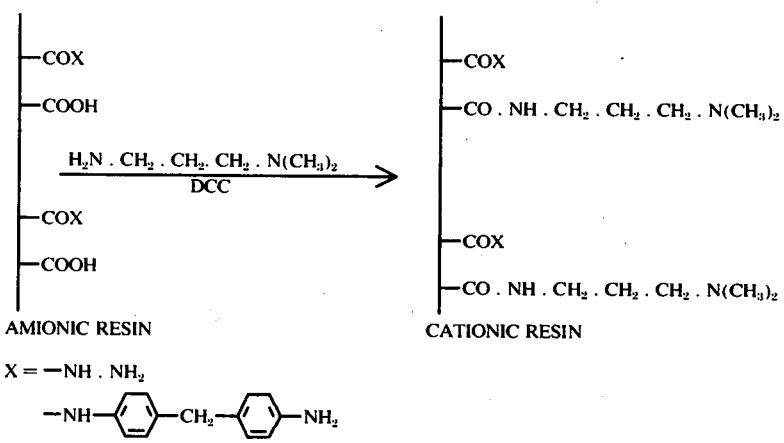

Cationization of EMA-MDA and EMA-hydrazide resins.
SCHEME 2

We claim:
1. An enzymatically active substance, comprising: a polymeric hydrophilic carrier, selected from the group consisting of EMA-p,p'-diaminodiphenyl methane and EMA-hydrazide made cationic by reaction with N,N-dimethyl-1,3-propane diamine, said EMA-P,P'-diaminodiphenyl methane and EMA - hydrazide being the reaction product of ethylene-maleic anhydride copolymer (EMA) having pendent anhydride groups and an amount sufficient to provide an essentially complete reaction with the EMA pendent anhydride groups of diamine selected from the group consisting of hydrazine and p,p'-diaminodiphenylmethane whereby reaction between the diamine and the pendent anhydride groups of the EMA provides said polymeric carrier with pendent amine groups, and said cationic carrier having an enzyme covalently bound thereto.

* * * * *